E. McArdle,

Tool for Making Glass Bottles.

Nº 54,572 Patented May 8, 1866.

Witnesses:
A. Richardson
James P. Boswell

Inventor:
Edward McArdle

UNITED STATES PATENT OFFICE.

EDWD. McARDLE, OF EAST CAMBRIDGE, MASSACHUSETTS.

IMPROVED TOOL FOR HOLDING GLASS BOTTLES.

Specification forming part of Letters Patent No. 54,572, dated May 8, 1866.

*To all whom it may concern:*

Be it known that I, EDWARD McARDLE, of East Cambridge, in the city of Cambridge and county of Middlesex, in the State of Massachusetts, have invented a new and Improved Snap-Dragon or Socket for Holding Glass while in the Process of Manufacture into Bottles and the like; and I do hereby declare the same to be fully described and represented in the following specification and the accompanying drawings, reference being had to the letters of reference marked thereon, of which—

Figure 1:
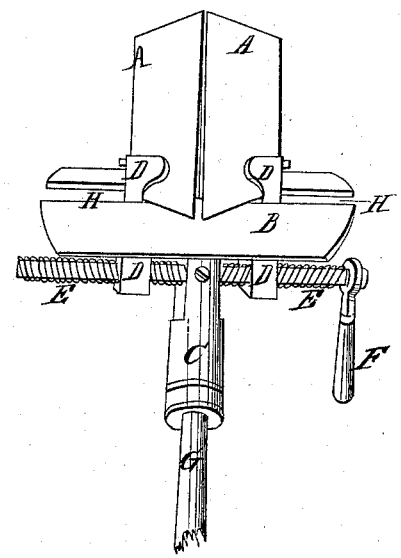
Figure 2:
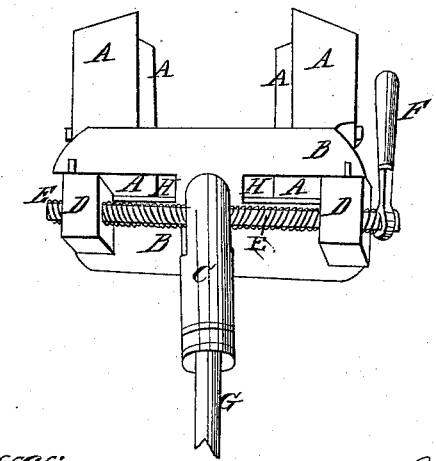

Figure 1 shows the socket closed and the upper surface of the plate upon which it rests, and Fig. 2 the socket or snap-dragon extended and the bottom or under surface of the plate.

The chief purpose of my invention is in the construction of a snap-dragon or socket so that it may be adjusted to hold various sizes of glass while in the process of manufacture, thus saving not only time and labor, but the expense and labor of providing a new socket or snap-dragon for various sized glass. For this purpose I construct a socket in two pieces, each piece of an angle in shape, so that when brought together they form a square socket, of which, in Fig. 1, A is the socket closed, and in Fig. 2, A the socket extended, in order that they may be adjusted. I provide, in the first place, an iron plate, B, provided on the under side with a shoulder, C, said shoulder being in the center of the plate B, Figs. 1 and 2. Through this shoulder passes a right and left hand screw, E, by which the socket is adjusted. For this purpose the flanges A A, which compose the socket, are provided with a shoulder, D, which passes through the plate B, through the grooves H H, Figs. 1 and 2, which diverge right and left from the center of the plate B. The shoulders D have a hole drilled through them, and tapped to correspond to the size of the thread of the screw E, said screw being held in the center of the shoulder C of the plate B by means of a screw which passes into a groove in the center of the right and left hand screw E, the whole being operated by means of the handle F, attached to the end of the screw E.

G is the rod or handle by which the socket, after being adjusted to the glass, is held. The whole is constructed of iron.

To explain its use or operation, by referring to Figs. 1 and 2, by turning the handle F toward you, the right and left hand screw E is turned, which, working in a thread on the shoulders D of the flanges of the socket A, causes them to recede until there is sufficient space to admit the required sized glass. By turning the handle F from you the reverse is the case, causing the flanges to advance together.

What I claim as my invention, and desire to secure by Letters Patent of the United States, is—

The combination of the jaws A, slotted plate B, screw D, and stock C, all constructed and arranged substantially as described.

EDWARD McARDLE.

Witnesses:
A. RICHARDSON,
A. S. JOHNSON.